(12) United States Patent
Jones et al.

(10) Patent No.: US 8,576,386 B2
(45) Date of Patent: Nov. 5, 2013

(54) DETECTING PARTICULATE CONTAMINANTS IN A FLUID

(75) Inventors: Martin Peter William Jones, Emsworth (GB); Richard Damon Goodman Roberts, Southampton (GB); Mark Volanthen, Fareham (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 714 days.

(21) Appl. No.: 12/523,179

(22) PCT Filed: Jan. 25, 2008

(86) PCT No.: PCT/GB2008/050051
§ 371 (c)(1),
(2), (4) Date: Jun. 25, 2010

(87) PCT Pub. No.: WO2008/090381
PCT Pub. Date: Jul. 31, 2008

(65) Prior Publication Data
US 2011/0085156 A1    Apr. 14, 2011

(30) Foreign Application Priority Data

Jan. 26, 2007 (GB) .................................. 0701558.9

(51) Int. Cl.
*G01L 1/24* (2006.01)
(52) U.S. Cl.
USPC ....................................................... 356/35.5
(58) Field of Classification Search
USPC ........ 356/34–35, 35.5, 71–73, 28; 73/861.04, 73/861.27, 861.73, 61.75, 24.01, 64.53; 702/54, 56, 32
See application file for complete search history.

(56) References Cited

U.S. PATENT DOCUMENTS

| | | | | |
|---|---|---|---|---|
| 3,906,780 | A * | 9/1975 | Baldwin | 73/61.75 |
| 5,549,000 | A * | 8/1996 | Brown et al. | 73/587 |
| 5,571,974 | A * | 11/1996 | Nauful | 73/861.27 |
| 5,639,667 | A * | 6/1997 | Heslot et al. | 436/148 |
| 6,706,348 | B2 * | 3/2004 | Quigley et al. | 428/36.3 |
| 7,072,044 | B2 * | 7/2006 | Kringlebotn et al. | 356/477 |
| 7,265,832 | B2 * | 9/2007 | Montgomery et al. | 356/338 |
| 7,578,203 | B2 * | 8/2009 | Andersen et al. | 73/861.21 |
| 7,673,525 | B2 * | 3/2010 | Huang | 73/861.25 |
| 2003/0010126 | A1 * | 1/2003 | Romanet et al. | 73/649 |
| 2004/0006409 | A1 * | 1/2004 | Liljenberg et al. | 700/266 |
| 2005/0109112 | A1 | 5/2005 | Gysling et al. | |
| 2005/0171710 | A1 * | 8/2005 | Gysling et al. | 702/54 |
| 2007/0175280 | A1 * | 8/2007 | Johansen | 73/599 |
| 2008/0225264 | A1 * | 9/2008 | Melnyk | 356/28 |
| 2009/0107558 | A1 * | 4/2009 | Quigley et al. | 137/15.01 |
| 2010/0125428 | A1 * | 5/2010 | Moore | 702/56 |

FOREIGN PATENT DOCUMENTS

| EP | 1635034 | 6/2009 |
|---|---|---|
| WO | 02/23169 | 3/2002 |

* cited by examiner

*Primary Examiner* — Sang Nguyen
(74) *Attorney, Agent, or Firm* — Brandon S. Clark; Bryan P. Galloway

(57) ABSTRACT

A vibration detector (1) comprising at least one fiber optic sensor (2) mechanically coupled to a flexible support member (3). The vibration detector (1) is mounted on the outside of the pipeline and a signal from the fiber optic sensor is measured. This signal is indicative of whether the vibration detector is experiencing vibrations due to collisions of contaminant particles with each other and/or with the walls of the pipeline. A method for detecting particulate contaminants in a fluid flowing in a pipeline is also provided.

16 Claims, 3 Drawing Sheets

DETECTING PARTICULATE CONTAMINANTS IN A FLUID

FIELD OF THE INVENTION

This invention relates to a method and apparatus for detecting particulate contaminants in a fluid flowing in a pipeline.

BACKGROUND TO THE INVENTION

In any industry that transports its goods using pipelines, sediments are a major problem. In the oil industry, for example, it is often necessary to clean slurry out of pipelines in order to maintain their capacity and to prevent erosion of the pipelines and downstream equipment. The sediments can arrive in the liquid or gas being transported, or they can enter the pipe through breaks in the structure. The cleaning of a pipe is commonly done using Pipeline Inspection Gauges (PIGs), which are also used to determine the levels of slurry. This process disrupts the normal use of the pipeline and costs a great deal of time and money. Being able to effectively monitor the levels of contaminants in a pipe would allow the operators to manage its use more effectively, since they would be able to judge more accurately the best time to clear the pipe. Moreover, when detecting contaminants in an oil pipeline, for example, the oil extraction method can be adapted to reduce the amount of contaminants in the oil.

SUMMARY OF THE INVENTION

According to a first aspect of this invention, there is provided a method for detecting particulate contaminants in a fluid flowing in a pipeline, the method comprising: providing at least one vibration detector comprising at least one fibre optic sensor; mounting the vibration detector on the outside of the pipeline; and, while the fluid travels along the pipeline, monitoring signals from the vibration detector, whereby to identify vibrations that are characteristic of collisions of particulate contaminants in the fluid.

This method provides a way of passively detecting particulate contaminants in a moving fluid where that fluid is contained in a structure such as a pipeline. As the fluid moves, contaminant particles will collide with the walls of the pipeline and/or with each other. This causes distinctive vibrations that are transmitted to the vibration detector and can be measured by the fibre optic sensor. The nature of these vibrations will depend upon the mass and size of the contaminant particles, and hence the presence of contaminants can be deduced from atypical vibrations.

The use of a fibre optic sensor allows the detection method to be applied in situations where the use of electrical components would be difficult or dangerous, such as under high pressure or where there is a risk of explosion.

Mounting the vibration detector outside the pipeline has the advantage that the vibration detector requires no contact with the fluid in the pipeline. By fixing the vibration detector to the structure of the pipeline, the vibrations in the structure caused by the particles colliding with the structure and with each other are transmitted to the vibration detector, where they can be measured. In effect, the structure becomes a sounding board for the vibration detector.

The invention is of particular use for liquid pipelines, such as oil pipelines or pipelines carrying gasses such as natural gas. Because the nature of the detected vibrations depends upon the mass and size of the contaminant particles, the invention may even be used to monitor pipes containing powders, pellets or other particulate matter, which may for example be pneumatically conveyed in a gas stream, where the contaminant particles differ in mass and/or size from the particles to be transported.

The vibration detector may be retro-fitted to a pipeline.

The vibration detector can be mounted to the pipeline in any suitable manner. For example, the detector may be bonded to the structure, or clamped in place by some mechanical means. The vibration detector may be mounted to the pipeline by means of at least one mechanical clamp.

Where the vibration detector is particularly sensitive, it may be possible to space the vibration detector from the pipeline, so that it is not in direct contact with the pipeline.

The vibration detector may comprise a flexible support member. The fibre sensor may be mechanically coupled to the flexible support member. The flexible support member provides a relatively rugged base on or in which the potentially fragile fibre grating strain sensor may be mounted and/or embedded.

The vibration detector preferably comprises a plurality of fibre optic sensors, and most preferably at least three fibre optic sensors provided in a spaced relationship on the flexible support member.

By providing three FBG strain sensors a model of the movements of the flexible support member in three dimensions can be obtained and measurement redundancy is provided.

The or each fibre optic sensor may be an optical fibre strain sensor. In other words, the or each fibre optic sensor may be an optical fibre including at least a portion that is sensitive to changes in strain. For example, the or each fibre optic sensor may comprise a diffraction grating. Thus, the or each fibre optic sensor may be a fibre Bragg grating (FBG) for example.

For even greater sensitivity, the or each fibre optic sensor may comprise a laser cavity. For example, where a fibre optic sensor is a fibre grating, the fibre optic sensor may comprise the distributed resonator of a distributed feedback (DFB) laser, in particular a DFB fibre laser. Such devices have been found to provide a desirably high level of sensitivity for use in accordance with the invention.

According to a second aspect of the invention there is provided a vibration detector adapted to detect particulate contaminants in a fluid flowing in a pipeline, the detector comprising: at least one fibre optic sensor; and mounting means adapted to mount the vibration detector on the outside of a pipeline.

The vibration detector preferably comprises a plurality of fibre optic sensors, and most preferably three or more fibre optic sensors.

The vibration detector may comprise a flexible support member. The or each fibre optic sensor may be mechanically coupled to the flexible support member. The flexible support member provides a relatively rugged base on or in which the potentially fragile fibre optic sensor or sensors may be mounted and/or embedded.

The vibration detector preferably comprises a plurality of fibre optic sensors, and most preferably at least three fibre optic sensors provided in a spaced relationship on the flexible support member.

By providing three FBG strain sensors a model of the movements of the flexible support member in three dimensions can be obtained and measurement redundancy is provided.

The mounting means may comprise adhesive such that the detector may be bonded to the pipeline structure. The mounting means may alternatively comprise at least one mechanical clamp.

The or each fibre optic sensor may be an optical fibre strain sensor. In other words, the or each fibre optic sensor may be an optical fibre including at least a portion that is sensitive to changes in strain. For example, the or each fibre optic sensor may comprise a diffraction grating. Thus, the or each fibre optic sensor may be a fibre Bragg grating (FBG) for example.

For even greater sensitivity, the or each fibre optic sensor may comprise a laser cavity. For example, where a fibre optic sensor is a fibre grating, the fibre optic sensor may comprise the distributed resonator of a distributed feedback (DFB) laser, in particular a DFB fibre laser. Such devices have been found to provide a desirably high level of sensitivity for use in accordance with the invention.

According to a third aspect of the invention there is provided a particulate contaminant detection means comprising a vibration detector according to the second embodiment and a data processor configured to monitor signals from the vibration detector, whereby to identify vibrations that are characteristic of collisions of contaminant particles in the fluid.

It may be that there is provided at least one interferometer, such as a Mach-Zehnder interferometer, to measure changes in the wavelength of the output of the or each fibre optic sensor. A single interferometer can be used to monitor multiple different sensors if the sensors are multiplexed. The signals can be wavelength multiplexed, and separated using a filter to select a particular wavelength. Alternatively, the signals may be time multiplexed.

BRIEF DESCRIPTION OF THE DRAWINGS

Embodiments of the invention will now be described by way of example only and with reference to the figures, in which.

DETAILED DESCRIPTION OF AN EMBODIMENT

Figure 1:
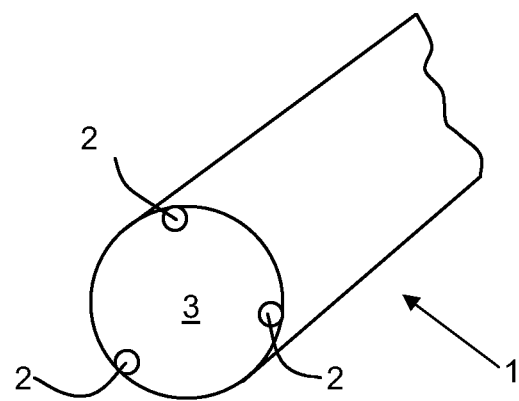
FIG. 1 is a perspective representation of a vibration detector according to a first embodiment of the invention.

Referring to FIG. 1, a vibration detector 1 is shown. The detector comprises three optical fibres 2 set within a flexible support member 3, which is made from glass fibre epoxy resin in order to provide a strong but flexible support. The optical fibres have periodic variations in the refractive index of their cores in order that they can function as fibre Bragg gratings (FBGs). This allows the strain that the optical fibres are experiencing to be deduced from variations in the transmissive and reflective properties of the optical fibres. The structure and operation of FBGs as strain sensors will be will know to the person skilled in the art, and so will not be described in detail here. From these measurements the movements of the flexible support member can be calculated and the vibrations measured. Typically, such vibrations are in the range 0 to 20 kHz and are maximised at bends, junctions or restrictions in the pipeline. Consequently, it is desirable to locate the vibration sensor at such locations.

The frequency of the vibrations in the flexible support member 3 can be measured with a single fibre grating strain sensor. However, it is possible to use a different number of fibre grating strain sensors. Three FBG strain sensors are used in the embodiment shown because three is the minimum number required to give a model of the movements of the flexible support member 3 in three dimensions, which may assist in providing more detailed monitoring of the vibrations, as well as measurement redundancy.

Figure 2:
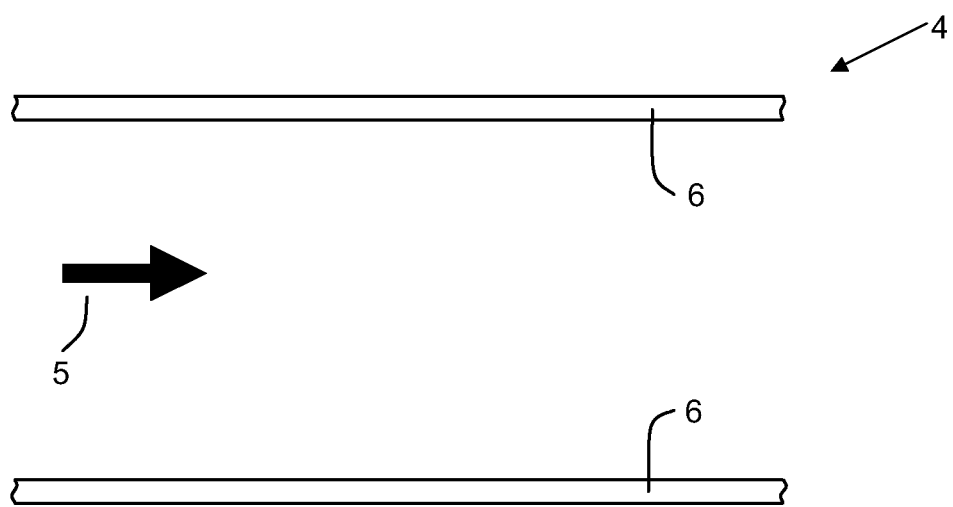
FIG. 2 is a diagrammatic view through a pipe to be fitted with a vibration detector according to the first embodiment of the invention.
Figure 3:
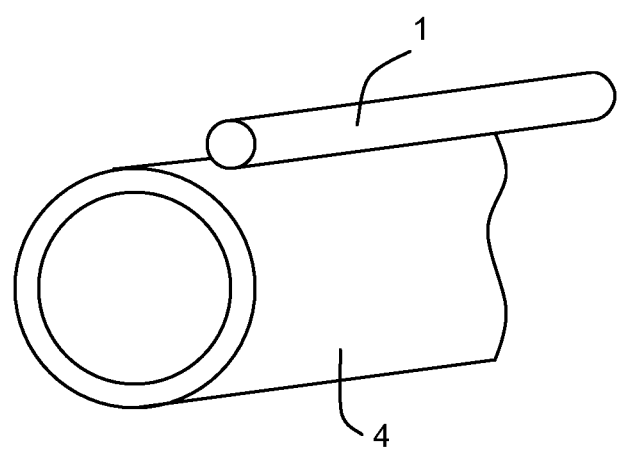
FIG. 3 is a cross-section of the pipe of FIG. 2 that is fitted with a vibration detector according to the first embodiment of the invention.

FIGS. 2 and 3 illustrate the first embodiment of the invention, in use. A pipe 4 (shown in FIG. 2) is carrying a fluid in the direction of flow, indicated by an arrow 5. The vibration detector 1 is attached to the outside of the pipe wall 6 using epoxy resin. It is connected in such a way that movements in the pipe are conveyed to the detector. In this embodiment, the particles in the fluid collide with each other and with the walls of the pipe as the fluid flows. This causes vibrations in the pipe and hence in the vibration detector.

Figure 4:
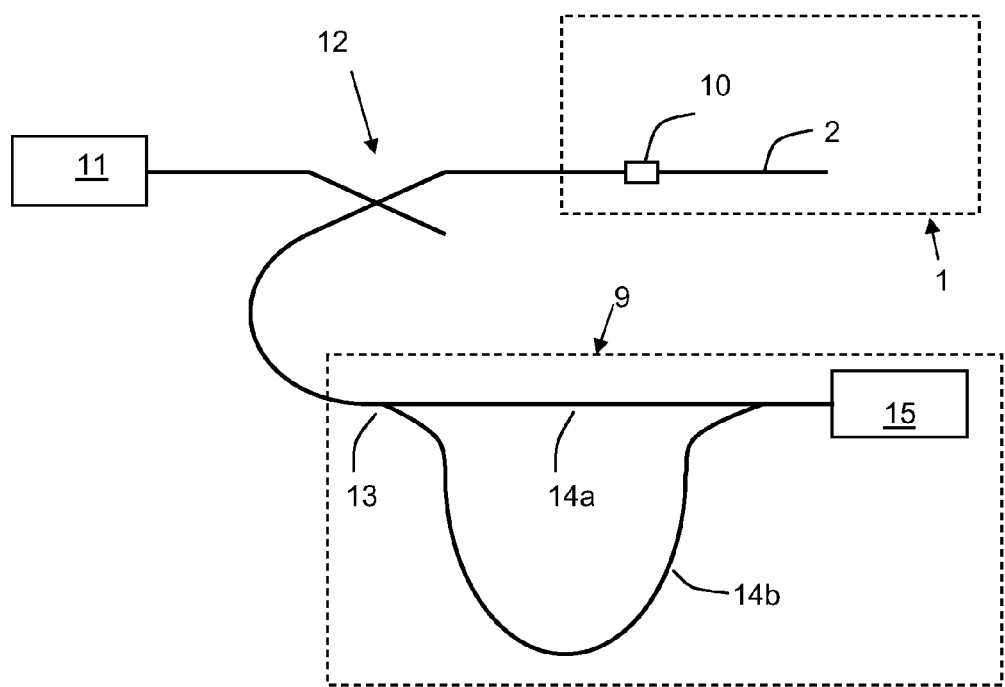
FIG. 4 is a diagrammatic representation of a vibration detector according to a second embodiment of the invention.

While in the example given above the FBG strain sensors are provided in passive fibre, enhanced sensitivity can be achieved by including active gain material in the optical fibre such that each FBG forms the distributed reflector of a Distributed Feedback (DFB) fibre laser. One particularly suitable system is illustrated in FIG. 4. The vibration detector 1 comprises an optical fibre 2, a region 10 of which is doped with rare earth ions such as Ytterbium and Erbium so that it will act as a laser cavity and gain medium, an FBG strain sensor being provided within the gain region 10. The pump source 11 is coupled to the gain region 10 through an optical coupler 12. The use of an FBG arranged as a DFB, rather than a passive FBG, increases the coherence length of the light returned from the FBG strain sensor. As the optical fibre 2 experiences strain, the resonant wavelength of the FBG provided at the gain region 10 will alter, and the wavelength of the light produced by the DFB fibre laser will vary.

The output of the FBG/DFB laser is coupled to a measuring system that uses a Mach-Zehnder interferometer 9. In the Mach-Zehnder interferometer 9, a beam splitter 13 divides the laser light into two signals. One signal travels by the short path 14a while the other travels by the long path 14b. The phase difference between the two signals when they recombine will depend upon the difference in path length and the wavelength of the laser light. Therefore, when the two signals are recombined the intensity of the resulting signal as measured by detector 15 will depend upon the wavelength of the light. Increasing the path difference between the two arms 14a, 14b of the interferometer 9 increases the sensitivity to changes in light. However, the path difference can only be increased if the light entering the interferometer 9 has a sufficiently large coherence length. The use of a DFB FBG, rather than a passive FBG, as the strain sensor element provides a larger coherence length. Therefore, the interferometer 9 provides a very accurate measure of the movements being experienced by the vibration detector 1.

In summary, a method for detecting particulate contaminants of a different size or mass in a fluid contained in a pipeline uses at least one vibration detector comprising at least one optical fibre strain sensor mechanically coupled to a flexible support member. The vibration detector is suspended in the fluid or mounted to the pipeline and a signal from the strain sensor is measured. This signal is indicative of whether the vibration detector is experiencing vibrations due to collisions of contaminant particles.

Various modifications may be made to the described embodiments without departing from the scope of the invention. For example, the vibration detector may comprise a different number of fibre optic sensors, which may be provided in a different configuration to that shown. The fibre optic sensors may comprise a different type of sensor to that shown, in particular they may comprise a different type of fibre optic strain sensor, or a different type of fibre optic grating may be used. The output of the DFB laser may be measured using a different type of interferometer or measuring system to that described.

The invention claimed is:

1. A method for detecting particulate contaminants in a fluid flowing in a pipeline, the method comprising: providing at least one vibration detector comprising at least one fiber optic sensor; mounting the vibration detector on the outside of the pipeline; and, while the fluid travels along the pipeline, monitoring signals from the vibration detector, whereby to identify vibrations inducing variations in the transmissive and reflective properties of the at least one fiber optic sensor that are characteristic of collisions of particulate contaminants in the fluid.

2. A method as claimed in claim 1, wherein the vibration detector is retro-fitted to a pipeline.

3. A method as claimed in claim 1 or 2, wherein the vibration detector is bonded to the structure, or clamped in place by some mechanical means.

4. A method as claimed in claim 3, wherein the vibration detector is mounted to the pipeline by means of at least one mechanical clamp.

5. A method as claimed in claim 1, wherein the vibration detector is spaced from the pipeline, so that it is not in direct contact with the pipeline.

6. A vibration detector adapted to detect particulate contaminants in a fluid flowing in a pipeline, the detector comprising: at least one fiber optic sensor; mounting means adapted to mount the vibration detector onto the outside of a pipeline and a data processor adapted to identify vibrations inducing variations in the transmissive and reflective properties of the at least one fiber optic sensor while the fluid travels along the pipeline.

7. A vibration detector as claimed in claim 6, wherein the vibration detector comprises a flexible support member to which the fiber optic sensor is mechanically coupled.

8. A vibration detector as claimed in claim 7, wherein the vibration detector comprises at least three fiber optic sensors provided in a spaced relationship on the flexible support member.

9. A vibration detector as claimed in claim 7, wherein the flexible support member provides a base on or in which the fiber optic sensor or sensors are mounted and/or embedded.

10. A vibration detector as claimed in claim 6, wherein the vibration detector comprises a plurality of fiber optic sensors.

11. A vibration detector as claimed in claim 6, wherein the mounting means comprises adhesive, such that the vibration detector may be bonded to the pipeline structure, or at least one mechanical clamp.

12. A vibration detector as claimed in claim 6, wherein the at least one fiber optic sensor is an optical fiber strain sensor.

13. A vibration detector as claimed in claim 12, wherein the at least one fiber optic sensor is a diffraction grating.

14. A vibration detector as claimed in claim 13, wherein the at least one fiber optic sensor is a fiber Bragg grating (FBG).

15. A vibration detector as claimed in claim 13, wherein the at least one fiber optic sensor comprises the distributed resonator of a distributed feedback (DFB) laser.

16. A vibration detector as claimed in claim 6, wherein at least one interferometer is provided to measure changes in the wavelength of the output of the or each fiber optic sensor.

* * * * *